(12) United States Patent
Lee et al.

(10) Patent No.: US 9,170,442 B2
(45) Date of Patent: Oct. 27, 2015

(54) LIQUID CRYSTAL DISPLAY, MOBILE TERMINAL HAVING THE LIQUID CRYSTAL DISPLAY, AND METHOD OF MANUFACTURING THE LIQUID CRYSTAL DISPLAY

(71) Applicant: LG ELECTRONICS INC., Seoul (KR)

(72) Inventors: Kiyong Lee, Bucheon (KR); Seungmin Seen, Seoul (KR); Jeongseok Ki, Bucheon (KR); Sangjo Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 172 days.

(21) Appl. No.: 13/846,811

(22) Filed: Mar. 18, 2013

(65) Prior Publication Data

US 2014/0098310 A1    Apr. 10, 2014

(30) Foreign Application Priority Data

Oct. 5, 2012    (KR) .................. 10-2012-0110898

(51) Int. Cl.
*G02F 1/1343*    (2006.01)
*G02F 1/133*     (2006.01)
*G02F 1/1337*    (2006.01)
*G02F 1/13*      (2006.01)

(52) U.S. Cl.
CPC .......... *G02F 1/13306* (2013.01); *G02F 1/1303* (2013.01); *G02F 1/13378* (2013.01); *G02F1/133707* (2013.01); *G02F 1/134309* (2013.01); *G02F 1/134363* (2013.01); *G02F 2001/133792* (2013.01)

(58) Field of Classification Search
CPC .................. G02F 1/134309; G02F 1/136286; G02F 1/133707; G02F 1/134336; G02F 1/134363; G02F 1/13439; G02F 1/1337; G02F 1/1343; G02F 1/1333; G02F 1/133345; G02F 1/133753; G02F 1/136209; G02F 1/133512; G02F 1/133514; G02F 1/139; G02F 2001/134372; G02F 2001/134318; G02F 2001/134381; G02F 2001/133388; G02F 2001/133757; G02F 2001/133765; G02F 2001/136295; G02F 2201/50; H01L 27/3276; G09G 2300/0447; G09G 2300/0426
USPC ........... 349/123, 138, 139, 33, 143, 106, 129, 349/130, 132, 141, 153, 158, 187, 191, 58
See application file for complete search history.

(56) References Cited

U.S. PATENT DOCUMENTS 6,965,421 B2 * 11/2005 Tsuchiya ...................... 349/125
2012/0236483 A1    9/2012 Watanabe

FOREIGN PATENT DOCUMENTS

JP    2005-010480    1/2005

OTHER PUBLICATIONS

European Patent Office Application Serial No. 13003873.0, Search Report dated Oct. 29, 2013, 10 pages.

*Primary Examiner* — Thoi Duong
(74) *Attorney, Agent, or Firm* — Lee, Hong, Degerman, Kang & Waimey

(57) ABSTRACT

A liquid crystal display is provided that includes a first base substrate including a first surface, a second base substrate including a second surface, a liquid crystal layer including liquid crystal molecules positioned between the first and second base substrates and configured to change alignment when electrical power is applied thereto, a first electrode positioned on the second surface and including a plurality of substantially parallel grooves extending in a first direction on a surface facing the first base substrate, the plurality of grooves configured to align the liquid crystal molecules in a preset direction when electrical power is applied, and a second electrode positioned on the first surface or on the second surface, wherein a voltage difference between the first and second electrodes applies the electrical power to the liquid crystal molecules.

12 Claims, 11 Drawing Sheets

LIQUID CRYSTAL DISPLAY, MOBILE TERMINAL HAVING THE LIQUID CRYSTAL DISPLAY, AND METHOD OF MANUFACTURING THE LIQUID CRYSTAL DISPLAY

CROSS-REFERENCE TO RELATED APPLICATION

Pursuant to 35 U.S.C. §119(a), this application claims the benefit of earlier filing date and right of priority to Korean Application No. 10-2012-0110898, filed on Oct. 5, 2012, the contents of which is incorporated by reference herein in its entirety.

FIELD OF THE INVENTION

The present disclosure relates to a mobile terminal having a liquid crystal display and a method of manufacturing the liquid crystal display.

DESCRIPTION OF THE RELATED ART

A mobile terminal is an electronic communication device that can be carried around and is capable of performing one or more functions, such as voice and video call communications, inputting and outputting information, and storing data. Multifunctional mobile terminals operate as integrated multimedia players and are capable of capturing still or moving images, playing music or video files, playing games and receiving broadcasts. Structural and software improvements that support and enhance the functions of multifunctional terminals may make the terminals more convenient for users.

For example, objects such as icons, widgets, or application execution menus may be displayed on a display of the mobile terminal. The displayed objects may be scrolled along and eventually scrolled off of the display in response to a touch input, such as a drag touch input, applied to the display.

In order to maintain low power consumption, mobile terminals are often provided with liquid crystal displays. To accommodate user preferences, research is actively ongoing for reducing the thickness of mobile terminals and for increasing display regions of mobile terminals.

SUMMARY

An objective of the present disclosure is to provide a mobile terminal having a slim thickness, and having a liquid crystal display (LCD) panel that has an increased display region.

A liquid crystal display (LCD) includes first base substrate having a first surface, a second base substrate having a second surface facing the first surface, a liquid crystal layer positioned between the first base substrate and the second base substrate, the liquid crystal layer including liquid crystal molecules configured to change alignment when electrical power is applied to the liquid crystal molecules, a first electrode positioned on the second surface, the first electrode including a substantially parallel plurality of grooves extending in a first direction on a surface of the first electrode facing the liquid crystal layer and the first base substrate, the plurality of grooves configured to align the liquid crystal molecules in a preset direction when the electrical power is applied to the liquid crystal molecules, and a second electrode positioned on the first surface or the second surface. A voltage difference between the first electrode and the second electrode applies the electrical power to the liquid crystal molecules.

In an aspect, the LCD further includes signal lines positioned on the second surface, spaced apart from the first electrode and configured to transfer signals, and an insulating layer positioned between the signal lines and the first electrode and configured to provide electrical insulation between the first electrode and the signal lines. In a further aspect, the insulating layer overlaps the signal lines and is further configured to prevent the signal lines from being visible from outside the LCD. In an aspect, the plurality of grooves is formed on the surface of the first electrode by etching the first electrode with an ionized gas. In another aspect, the second electrode is positioned on the second surface, the first electrode further includes a substantially parallel plurality of electrode layers extending in a second direction that crosses the first direction, and the plurality of electrode layers are separated from each other by gaps. In a further aspect, the LCD further includes an insulating material positioned in the gaps and configured to restrict static electricity between the plurality of electrode layers. In an additional aspect, the LCD further includes an alignment film positioned on the first surface and configured to align the liquid crystal molecules in the preset direction. In another aspect, the alignment film and the insulating material include a same material. In an aspect, the LCD further includes a seal positioned along edges of the first base substrate and the second base substrate and configured to couple the first base substrate to the second base substrate.

A method of making a liquid crystal display (LCD) includes forming a first electrode on a surface of a first base substrate, the first electrode formed of a transmissive material, forming a substantially parallel plurality of grooves on a surface of the first electrode positioned away from the first base substrate, the plurality of grooves extending in a first direction, coupling a second base substrate to the first base substrate on a same side of the first base substrate on which the first electrode is formed, the second base substrate including a color filter layer positioned on a surface of the second base substrate facing the first base substrate, and placing liquid crystals in a space defined by the coupled first base substrate and second base substrate.

In an aspect, forming the plurality of grooves includes coating the surface of the first electrode with a high molecular film, the high molecular film coating including gaps configured to expose portions of the surface of the first electrode where the plurality of grooves are to be formed, and colliding an ionized gas into the exposed portions of the surface of the first electrode to form the exposed portions of the surface of the first electrode. In a further aspect, the high molecular film is further coated onto surfaces of the plurality of grooves. In another aspect, coupling the second base substrate to the first base substrate includes forming a seal line between the first base substrate and the second base substrate, and hardening the seal line via ultraviolet ray irradiation. In a further aspect, the method also includes positioning signal lines on the surface of the first base substrate, the signal lines configured for transferring signals, and wherein the seal line is positioned a distance from the signal lines on the surface of the first base substrate. In another aspect, the seal is formed at edges of the first base substrate and the second base substrate. In a further aspect, coupling the second base substrate to the first base substrate includes overlapping the first base substrate and the second base substrate a distance apart from each other to form the space defined by the first base substrate and second base substrate, inserting a liquid sealant into the space, proximate edges of the first base substrate and second base substrate, such that the liquid sealant contacts the first base substrate and second base substrate, and hardening the liquid sealant to form a seal between the first base substrate and the second base substrate.

A mobile terminal includes a first body portion housing a first liquid crystal display (LCD), a second body portion housing a second liquid crystal display (LCD), and a hinge rotatably coupling the first body portion and second body portion together. Each of the first LCD and second LCD includes a first base substrate having a first surface, a second base substrate having a second surface facing the first surface, a liquid crystal layer positioned between the first base substrate and the second base substrate, the liquid crystal layer including liquid crystal molecules configured to change alignment when electrical power is applied to the liquid crystal molecules, a first electrode positioned on the second surface, the first electrode including a substantially parallel plurality of grooves extending in a first direction on a surface of the first electrode facing the liquid crystal layer and the first base substrate, the plurality of grooves configured to align the liquid crystal molecules in a preset direction when the electrical power is applied to the liquid crystal molecules, and a second electrode positioned on the first surface or the second surface. A voltage difference between the first electrode and the second electrode applies the electrical power to the liquid crystal molecules.

In an aspect, each of the first LCD and second LCD further includes a display region configured for outputting visual information, and a peripheral region surrounding the display region, wherein a side of the peripheral region closest to the hinge is narrower than a side of the peripheral region furthest from the hinge. In a further aspect, each of the first LCD and second LCD further includes a plurality of signal lines configured to transfer signals to the side of the peripheral region furthest from the hinge. In another aspect, the second electrode of each of the first LCD and second LCD is positioned on the corresponding first surface, and the first electrode of each of the first LCD and second LCD further includes a substantially parallel plurality of electrode layers extending in a second direction that crosses the first direction, the plurality of electrode layers separated from each other by gaps.

BRIEF DESCRIPTION OF THE DRAWINGS

The accompanying drawings, which are included to provide a further understanding of the disclosure and are incorporated in and constitute a part of this specification, illustrate embodiments in the disclosure and together with the description serve to explain the principles of the disclosure.

DETAILED DESCRIPTION

Figure 1:
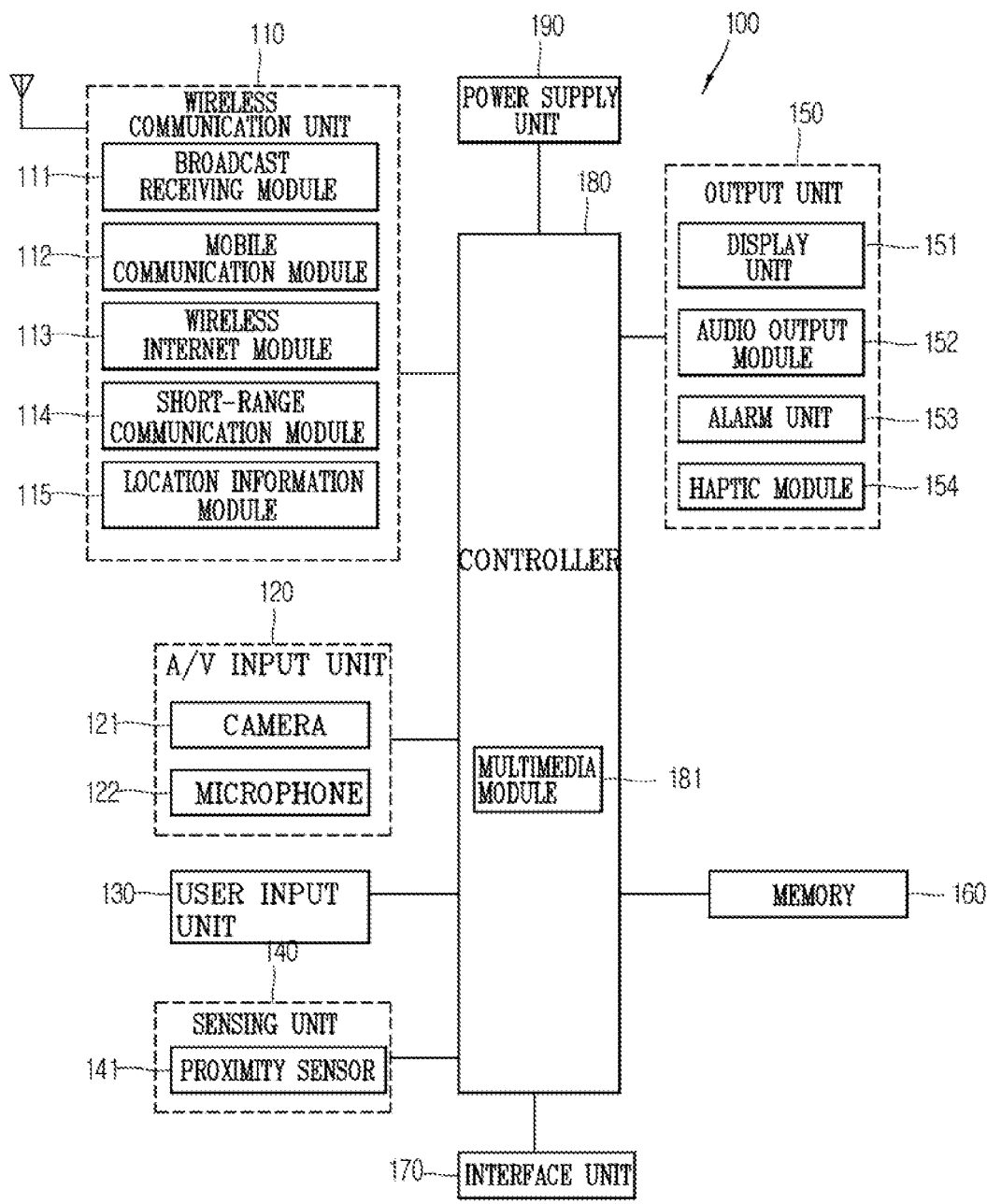
FIG. 1 is a block diagram of a mobile terminal according to an embodiment of the present invention.

Hereinafter, embodiments will be described in detail with reference to the accompanying drawings. However, such embodiments may be implemented in various forms, and therefore, these embodiments are not limited to those shown. For clarity, certain parts not related to the description are omitted, and like reference numerals designate like constituent elements throughout the specification.

As used herein, the suffixes "module" and "unit" are used for facilitation of the detailed description and do not have meanings or functions different from each other. Therefore, significant meanings or roles are not given to the suffixes themselves and it is understood that the terms 'module' and 'unit' can be used together or interchangeably.

Embodiments described in the description can be applicable to various types of terminals. Examples of such terminals include mobile as well as stationary terminals, such as mobile phones, user equipment, smart phones, DTV, computers, digital broadcast terminals, personal digital assistants, portable multimedia players (PMP), E-books, and navigation systems.

However, by way of non-limiting example only, further description will be provided with regard to a mobile terminal 100. It should be noted that such teachings may apply equally to other types of terminals.

FIG. 1 is a block diagram depicting a mobile terminal 100. Referring to FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. Although FIG. 1 shows the mobile terminal 100 having various components, it is understood that implementing all of the illustrated components is not a requirement. More or fewer components may alternatively be implemented.

The wireless communication unit 110 includes one or more components that permit wireless communication between the mobile terminal 100 and a wireless communication system or a network within which the mobile terminal 100 is located. For example, the wireless communication unit 110 may include a broadcast receiving module 111, a mobile communication module 112, a wireless Internet module 113, a short-range communication module 114 and a location information module 115. For non-mobile terminals, the wireless communication unit 110 may be replaced with a wired communication unit. The wireless communication unit 110 and a wired communication unit (not shown) may be commonly referred to as a communication unit.

The broadcast receiving module 111 receives a broadcast signal and/or broadcast associated information from an external broadcast managing entity via a broadcast channel. The broadcast channel may include a satellite channel and/or a terrestrial channel.

The broadcast managing entity may refer to a system that transmits a broadcast signal and/or broadcast associated information. The broadcast managing entity may be a server that generates and transmits broadcast signals and/or broadcast associated information or a server for receiving previously generated broadcast signals and/or broadcast-related information and transmitting the broadcast signals and/or the broadcast associated information to the mobile terminal 100. The broadcast signals may include not only TV broadcast signals, radio broadcast signals, and data broadcast signals, but also signals in the form of a TV broadcast signal combined with a radio broadcast signal.

The broadcast associated information may be information about a broadcast channel, a broadcast program, or a broadcast service provider. The broadcast associated information may even be provided over a mobile communication network, in which case the broadcast associated information may be received via the mobile communication module 112. Examples of broadcast associated information include an electronic program guide (EPG) of digital multimedia broadcasting (DMB) and an electronic service guide (ESG) of digital video broadcast-handheld (DVB-H).

The broadcast receiving module 111 may receive broadcast signals transmitted from various types of broadcast systems. As a non-limiting example, the broadcast systems include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The broadcast receiving module 111 may also receive multicast signals. The broadcast signals and/or the broadcast associated information received by the broadcast receiving module 111 may be stored in a suitable storage device, such as in the memory 160.

The mobile communication module 112 transmits/receives wireless signals to/from at least one of a base station, an external terminal or a server over a mobile communication network. The wireless signals may represent, for example, voice call signals, video telephony call signals or data in various forms according to the transmission/reception of text and/or multimedia messages.

The wireless Internet module 113 supports Internet access for the mobile terminal 100. The wireless Internet module 113 may be internally or externally coupled to the mobile terminal 100. Suitable technologies for wireless Internet include, but are not limited to, WLAN (Wireless LAN), Wi-Fi®, Wibro® (Wireless broadband), Wimax® (World Interoperability for Microwave Access), and HSDPA (High Speed Downlink Packet Access).

The wireless Internet module 113 may be replaced with a wired Internet module (not shown) in non-mobile terminals. The wireless Internet module 113 and the wired Internet module may be commonly referred to as an Internet module. Moreover, the wireless Internet module 113 can receive or download the data relevant to the area in which the mobile terminal 100 is located from the external server.

The short-range communication module 114 facilitates relatively short-range communications. Suitable technologies for short-range communication include, but are not limited to, radio frequency identification (RFID), infrared data association (IrDA), ultra-wideband (UWB), as well as networking technologies such as Bluetooth® and ZigBee®.

The location information module 115 identifies or otherwise obtains a location of the mobile terminal 100. The location information module 115 may obtain position information by using a global navigation satellite system (GNSS). The GNSS is a term used to describe radio navigation satellite systems configured to send reference signals capable of determining their positions on the surface of the earth or near the surface of the earth while revolving around the earth. The GNSS includes: a global position system (GPS) operated by the U.S.A.; Galileo operated by Europe; a global orbiting navigational satellite system (GLONASS) operated by Russia; Compass operated by China; and a quasi-zenith satellite system (QZSS) operated by Japan.

As a typical example of the GNSS, the location information module 115 is a GPS module. The location information module 115 may calculate information related to distances between one point or object and at least three satellites and information related to the time when the distance information was measured and apply trigonometry to the obtained distance information to obtain three-dimensional position information on the point or object according to the latitude, longitude, and altitude at a predetermined time. Furthermore, a method of calculating position and time information using three satellites and correcting the calculated position and time information using another satellite may also used. The location information module 115 continues to calculate a current position in real time and to calculate velocity information based on the position information.

With continued reference to FIG. 1, the audio/video (A/V) input unit 120 may be configured to provide audio or video signal input to the mobile terminal 100. The NV input unit 120 may include a camera 121 and a microphone 122. The camera 121 processes image frames of still pictures or video obtained by an image sensor in a photographing mode or a video telephony mode. The processed image frames may be displayed on a display unit 151.

The image frames processed by the camera 121 may be stored in the memory 160 or transmitted to an external device through the wireless communication unit 110. Optionally, the mobile terminal 100 can include two or more cameras 121.

The microphone 122 receives an external audio signal while the mobile terminal 100 is in a particular mode, such as a phone call mode, a recording mode and/or a voice recognition mode. The received audio signal is processed and converted into digital data. In the call mode, the processed digital data is transformed into a format transmittable to a mobile communication base station via the mobile communication module 112 and then output. Furthermore, the mobile terminal 100, and in particular the NV input unit 120, may include a noise removing algorithm to remove noise generated during the course of receiving the external audio signal.

The user input unit 130 generates input data in response to user manipulation of an associated input device or devices. Examples of such devices include a keypad, a dome switch, a static pressure/capacitance touchpad, a jog wheel and a jog switch. A specific example of the user input unit 130 is a touch screen in which a touchpad is combined with a display, as will be described below.

The sensing unit 140 provides status measurements of various aspects of the mobile terminal 100. For example, the sensing unit 140 may detect an open/closed status of the mobile terminal 100, relative positioning of components, such as a display and a keypad of the mobile terminal 100, a change of position of the mobile terminal 100 or a component of the mobile terminal 100, a presence or absence of user contact with the mobile terminal 100, an orientation of the mobile terminal 100 and/or acceleration/deceleration of the mobile terminal 100.

As an example, the mobile terminal 100 may be configured as a slide-type mobile terminal in which the sensing unit 140 may sense whether a sliding portion of the mobile terminal 100 is open or closed. The sensing unit 140 may also sense a presence or absence of power provided by the power supply unit 190 or a presence or absence of a coupling or other connection between the interface unit 170 and an external device. The sensing unit 140 may include a proximity sensor 141.

With continued reference to FIG. 1, a proximity sensor 141 can be provided within the mobile terminal 100 and may be enclosed by the touch screen or positioned around the touch screen. The proximity sensor 141 may detect a presence or non-presence of an object approaching a specific detecting surface or an object existing around the proximity sensor 141 using an electromagnetic field strength or infrared ray without physical contact. Accordingly, the proximity sensor 141 may have greater durability and greater utility than a contact type sensor.

The proximity sensor 141 can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor or an infrared proximity sensor. If the touch screen is an electrostatic type touch screen, the proximity sensor 141 may detect proximity of a pointer using a variation of an electric field according to the proximity of the pointer and the touch screen or touch sensor may be classified as the proximity sensor 141.

An action in which a pointer approaches the touch screen without contacting the touch screen, yet is recognized as being located on the touch screen, is referred to as a 'proximity touch'. An action in which the pointer actually touches the touch screen is referred to as a 'contact touch'. The position on the touch screen proximity-touched by the pointer refers to the position of the pointer that vertically opposes the touch screen when the pointer performs the proximity touch.

The proximity sensor 141 may detect a proximity touch and/or a proximity touch pattern, such as proximity touch distance, proximity touch duration, proximity touch position or proximity touch shift state. Information corresponding to the detected proximity touch action and/or the detected proximity touch pattern may be displayed on the touch screen.

The output unit 150 generates output relevant to the senses of sight, hearing and touch. The output unit 150 may include a display unit 151, an audio output module 152, an alarm unit 153, and a haptic module 154.

The display unit 151 displays information processed by the mobile terminal 100. For example, when the mobile terminal 100 is in a call mode, the display unit 151 may display a user interface (UI) or a graphic user interface (GUI) associated with the call. If the mobile terminal 100 is in a video communication mode or a photograph mode, the display unit 151 may display a photographed and/or received picture, a UI or a GUI.

The display unit 151 may include a liquid crystal display (LCD), a thin film transistor liquid crystal display (TFT LCD), an organic light-emitting diode (OLED), e-paper, a flexible display, or a 3-dimensional display. The mobile terminal 100 may include one or more of such displays.

The display unit 151 may have a transparent or light-transmittive type configuration, hereinafter referred to as a transparent display. A transparent OLED (TOLED) is an example of a transparent display. A rear configuration of the display unit 151 may also have the light-transmittive type configuration. In this configuration, a user is able to see an object located behind the terminal body via the area occupied by the display unit 151 of the terminal body.

At least two display units 151 may be provided. For example, a plurality of display units 151 may be provided on a single face of the mobile terminal 100 spaced apart from each other or built in one body. Alternatively, each of a plurality of display units 151 may be provided on different faces of the mobile terminal 100.

If the display unit 151 and a sensor for detecting a touch action (hereafter referred to as a 'touch sensor') are constructed in a mutual-layered structure (hereafter referred to as a 'touch screen'), the display unit 151 may be used as both an input device and an output device. For example, the touch sensor may include a touch film, a touch sheet or a touchpad. Moreover, the touch sensor may be transmissive so that the display can be viewed, and may include a structure for enhancing visibility of the touch screen in bright ambient conditions.

The touch sensor can be configured to convert a pressure applied to a specific portion of the display unit 151 or a variation of electrostatic capacity generated from a specific portion of the display unit 151 to an electric input signal. The touch sensor may detect a pressure of a touch as well as a touched position or magnitude of the touch.

If a touch input is made to the touch sensor, a signal(s) corresponding to the touch input is transferred to a touch controller (not shown). Content input in a touch manner may include characters, numbers or menu items. The touch controller processes the signal(s) and then transfers corresponding data to the controller 180. The controller 180 may determine which portion of the display unit 151 is touched.

The audio output module 152 may output audio data that is received from the wireless communication unit 110 in, for example, a call-receiving mode, a call-placing mode, a recording mode, a voice recognition mode or a broadcast receiving mode. The audio output module 152 may output audio data stored in the memory 160. The audio output module 152 may output an audio signal relevant to a function, such as a call signal receiving sound, or a message receiving sound performed by the mobile terminal 100. The audio output module 152 may include, for example, a receiver, a speaker or a buzzer.

The alarm unit 153 outputs a signal for announcing an occurrence of a particular event associated with the mobile terminal 100. Typical events include a call signal reception, a message reception, a key signal input and a touch input. The alarm unit 153 may output a signal for announcing the event occurrence via vibration as well as a video signal or an audio signal. The video signal is output via the display unit 151 and the audio signal is output via the audio output module 152. Therefore, at least the display unit 151 or the audio output module 152 can be regarded as part of the alarm unit 153.

The haptic module 154 may generate various haptic effects that can be sensed by a user. Vibration is a representative tactile effect generated by the haptic module 154. Strength and pattern of the vibration generated from the haptic module 154 may be controllable. For example, vibrations differing from each other can be output by being synthesized together or can be output in sequence.

The haptic module 154 may generate various haptic effects in addition to vibration. For example, the haptic module 154 may generate an effect caused by a pin array vertically moving against skin being touched, an air injection force via an injection hole, an air suction force via a suction hole, an effect of skimming on a skin surface, an effect of contact with an electrode, an effect of electrostatic power and/or an effect of a hot/cold sense using an endothermic or exothermic device.

The haptic module 154 can be configured to provide the haptic effect via direct contact. The haptic module 154 can also be configured to enable a user to experience the haptic effect via muscular sense of a finger or an arm. Two or more haptic modules 154 can be provided according to a configuration of the mobile terminal 100.

The memory 160 is generally used to store various types of data for supporting the processing, control, and storage requirements of the mobile terminal 100. Examples of such data include program instructions for applications operating on the mobile terminal 100, contact data, phonebook data, messages, audio, still pictures, and moving pictures. A recent use history or a cumulative use frequency of each data, such as use frequency for each phonebook, each message or each multimedia, may be stored in the memory 160. Moreover, data for various patterns of vibration and/or sound to be output when a touch input is received at the touch screen may be stored in the memory 160.

The memory 160 may include, for example, a flash memory, a hard disk, a multimedia card micro type memory, a random access memory (RAM), a static random access memory (SRAM), a read-only memory (ROM), an electrically erasable programmable read-only memory (EEPROM), a programmable read-only memory (PROM), a magnetic memory, a magnetic disk an optical disk, or a card type memory, such as SD memory or XD memory. The mobile terminal 100 may operate in association with a web storage that performs a storage function of the memory 160 via the Internet.

The interface unit 170 couples the mobile terminal 100 with external devices. The interface unit 170 receives data from an external device. The interface unit 170 is supplied with power and may be configured to deliver the power to elements within the mobile terminal 100.

The interface unit 170 may be configured to enable data to be transferred from the mobile terminal 100 to an external device. The interface unit 170 may be configured to include a wired/wireless headset port, an external charger port, a wire/wireless data port, a memory card port, a port for coupling to a device having an identity module, an audio input/output (I/O) port, a video input/output (I/O) port or an earphone port.

The identity module is a chip or card that stores various types of information for authenticating a use authority of the mobile terminal 100 and can include a user identity module (UIM), a subscriber identity module (SIM) and/or a universal subscriber identity module (USIM). A device provided with the above identity module (hereafter referred to as an 'identity device') may be manufactured in the form of a smart card. The identity device is connectable to the mobile terminal 100 via a corresponding port.

The interface unit 170 may be configured as a passage for supplying power to the mobile terminal 100 from a cradle that is connected to the mobile terminal 100. The interface unit 170 may facilitate delivery of various command signals, which are input via the cradle by a user, to the mobile terminal 100. Various command signals input via the cradle or the power may provide an indication for recognizing that the mobile terminal 100 is correctly loaded in the cradle.

The controller 180 typically controls the overall operations of the mobile terminal 100. For example, the controller 180 performs control and processing associated with voice calls, data communications and video conferences. The controller 180 may include a multimedia module 181 that provides multimedia playback. The multimedia module 181 may be configured as part of the controller 180 or may be configured as a separate component. The controller 180 may also perform pattern recognition processing for recognizing a handwriting input performed on the touch screen as a character and/or recognizing a picture drawing input performed on the touch screen as characters or images.

The power supply unit 190 provides power required by the various components of the mobile terminal 100. The power may be internal power, external power, or combinations thereof.

Embodiments described in the following description may be implemented within a recording medium that can be read by a computer or a computer-like device using software, hardware or combinations thereof. For hardware implementations, arrangements and embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors or electrical units for performing other functions. Such embodiments may also be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in the memory 160 and executed by the controller 180.

Figure 2A:
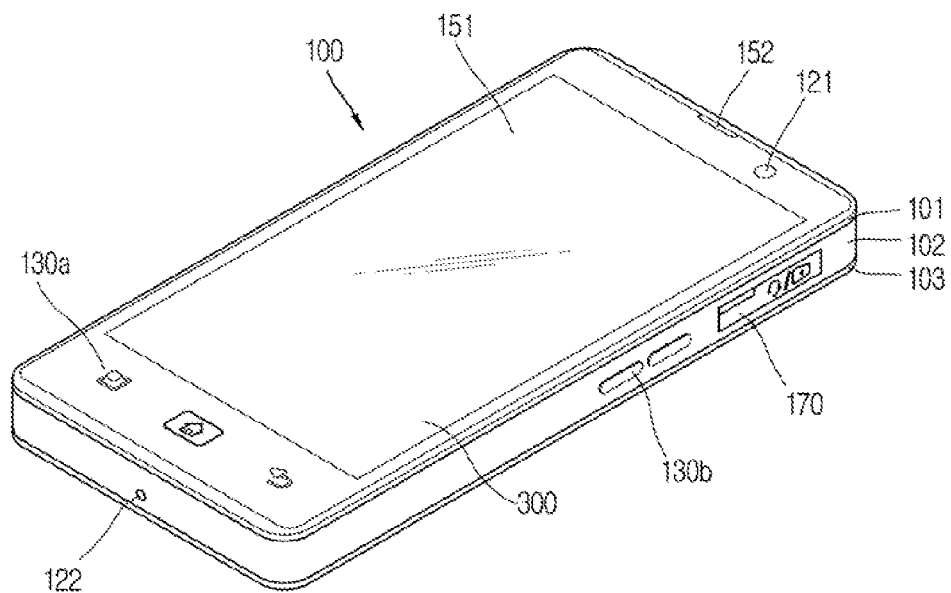
FIGS. 2A and 2B are perspective views depicting an external appearance of a mobile terminal according to an embodiment of the present invention.

FIG. 2A is a front perspective view showing an example of a front of the mobile terminal 100. The mobile terminal 100 of FIG. 2A is depicted as a bar-type terminal body. However, the mobile terminal 100 may be implemented in a variety of different configurations.

Examples of such configurations include a folder-type, a slide-type, a rotational-type, a swing-type and combinations thereof. For clarity, further disclosure will primarily relate to a bar-type mobile terminal 100. However such teachings apply equally to other types of mobile terminals.

The mobile terminal 100 includes a case, such as a casing, housing, or cover, that forms an exterior of the mobile terminal. The case may be divided into a front case 101, a rear case 102, and a cover 103 that forms a rear surface of the mobile terminal 100. Various electric/electronic parts are provided in a space between the front case 101 and the rear case 102. A middle case may be further provided between the front case 101 and the rear case 102. The cases can be formed by injection molding of synthetic resin or may be formed of a metallic material, such as stainless steel (STS), aluminum (Al) or titanium (Ti).

The display unit 151, audio output module 152, camera 121, first and second user manipulating units 130a and 130b, microphone 122 and/or the interface unit 170 can be provided on the terminal body, and more particularly on the front case 101.

The display unit 151 occupies most of a main face of the front case 101. The audio output module 152 and the camera 121 may be provided at an area adjacent to one end portion of the display unit 151, while the first manipulating unit 130a and the microphone 122 may be provided at an area adjacent to the other, opposite end portion of the display unit 151. The second manipulating unit 130b and the interface unit 170 can be provided on lateral sides of the front and rear cases 101 and 102.

The user input unit 130 (see FIG. 1) may receive a command for controlling an operation of the mobile terminal 100. The user input unit 130 may include a plurality of manipulating units, such as the first and second manipulating units 130a and 130b. The first and second user manipulating units 130a and 130b can be named a manipulating portion and may adopt any mechanism of a tactile manner that enables a user to perform a manipulation action by experiencing a tactile feeling.

Content input via the first manipulating unit 130*a* or the second manipulating unit 130*b* can be set to be different. For example, commands such as start, end and scroll can be input via the first manipulating unit 130*a*. Commands for adjusting volume of sound output from the audio output module 152 and for switching the display unit 151 to a touch recognizing mode can be input via the second manipulating unit 130*b*. Many other such configurations may be contemplated.

Figure 2B:
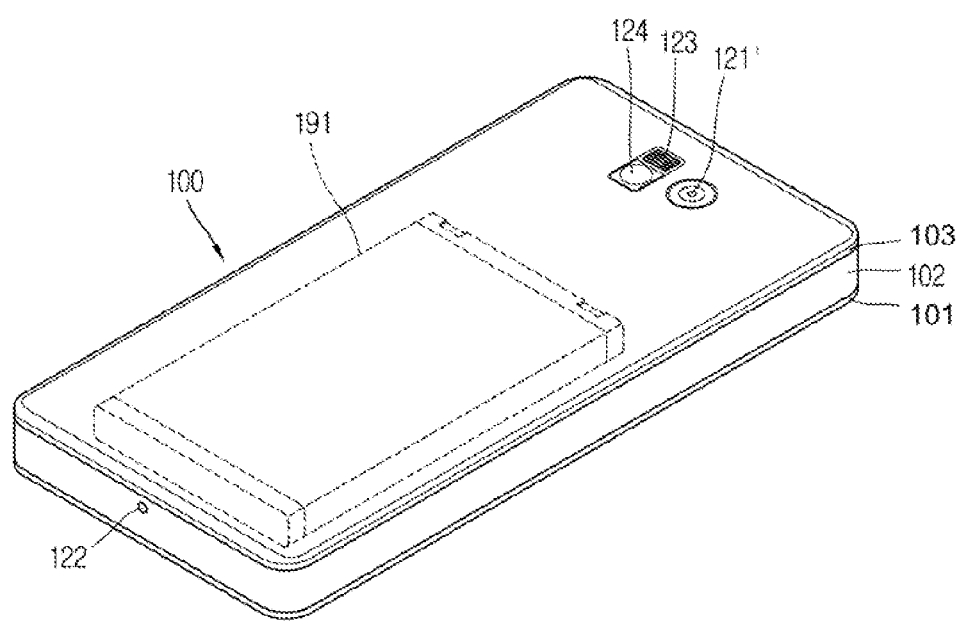

FIG. 2B is a rear perspective diagram of the mobile terminal 100 shown in FIG. 2A. Other embodiments, configurations and arrangements may also be provided.

As shown in FIG. 2B, an additional camera 121' can be provided on a rear side of the terminal body, and more particularly, on the rear case 102. The camera 121' on the rear case 102 has a photographing direction that is substantially opposite to that of the camera 121 shown in FIG. 2A and may have a different resolution.

For example, the camera 121 may use a smaller number of pixels than the camera 121', and thereby have a relatively lower resolution, to capture and transmit an image of the user's face for a video call. On the other hand, the camera 121' may use a greater number of pixels than the camera 121, and thereby have a relatively greater resolution in general, for capturing an image of a general subject for photography without transmitting the captured image. The cameras 121 and 121' may be capable of being rotated in relation to the terminal body or to pop-up from the terminal body.

A flash 123 and a mirror 124 may be disposed adjacent to the camera 121'. The flash 123 projects light toward a subject when photographing the subject using the camera 121'. When a user attempts to take a picture of himself/herself (self-photography) using the camera 121', the mirror 124 enables the user to view his/her face reflected by the mirror 124.

The power supply unit 190, such as a battery 191 in FIG. 2B, for example, for supplying power to the mobile terminal 100 may be provided in the terminal body. The power supply unit 190 can be configured to be built within the terminal body or to be detachably connected to the terminal body.

Antennas (not shown) may be disposed in the terminal body. For example, the mobile terminal 100 may include an antenna for mobile communication and an antenna for receiving broadcasting signals or wireless Internet signals. The antennas may be combined together to integrally provide various wireless communication services. The antennas may be mounted to the rear case 102 and be electrically coupled to a circuit board 282 (FIG. 3), and may transmit or receive radio signals through the cover 103.

Figure 3:
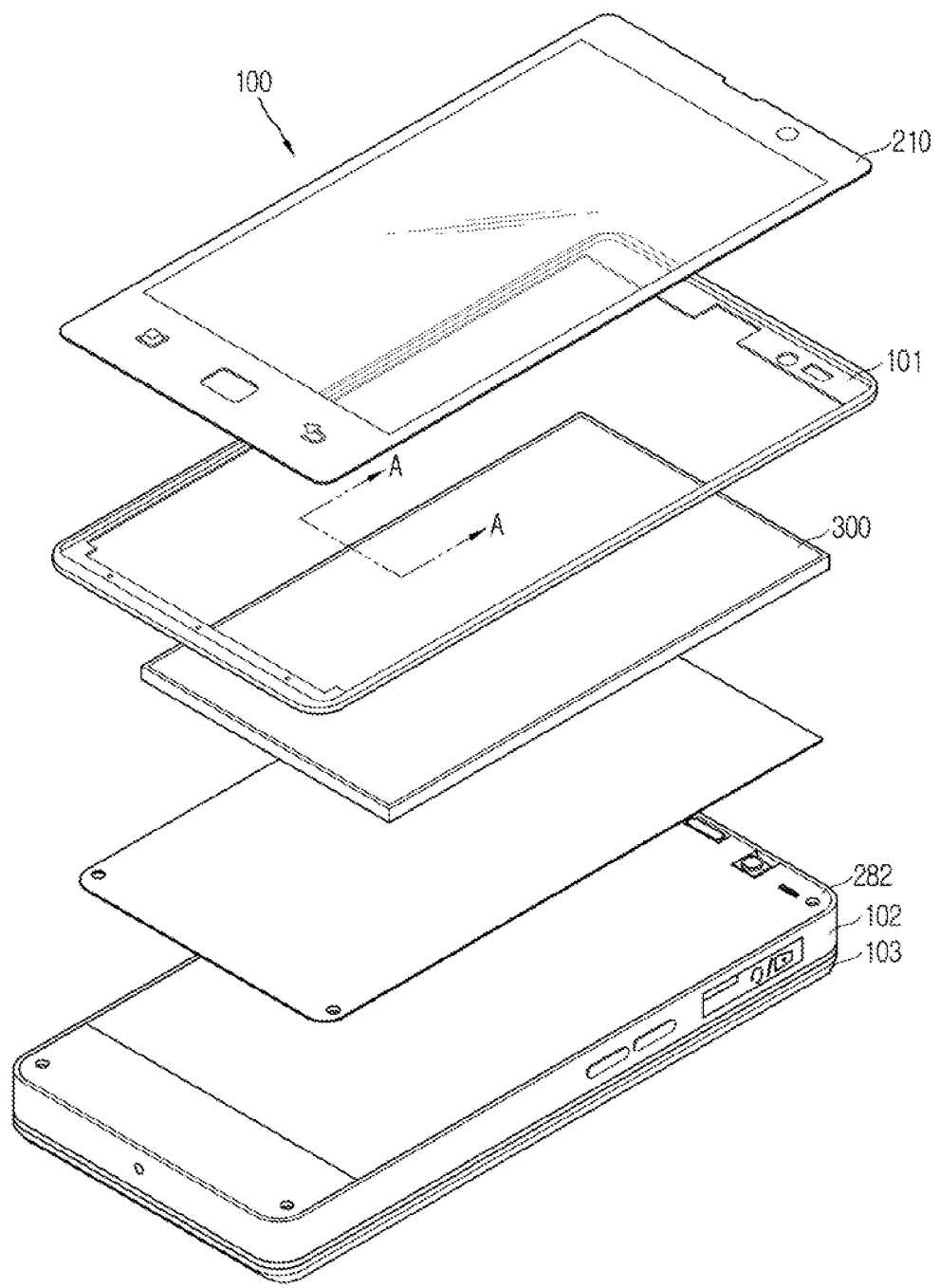
FIG. 3 is a disassembled view of the mobile terminal of FIGS. 2A and 2B.

FIG. 3 is a disassembled perspective view of the mobile terminal 100 of FIG. 2B. In FIG. 3 the display unit is implemented as an LCD in which liquid crystals are aligned when electrical power is applied to the liquid crystals. The LCD includes electrodes patterned to align liquid crystals. Hereinafter, a structure of the display unit according to each embodiment will be explained.

Referring to FIG. 3, the circuit board 282 is positioned within the terminal body. The circuit board 282 may be mounted to the front case 101 or the rear case 102, or to an additional inner structure. Various electronic devices may be mounted on a surface of the circuit board 282.

The circuit board 282 is an example of the controller 180 (FIG. 1) for operating various components of the mobile terminal 100. The mobile terminal may include a plurality of circuit boards 282 and the combination of the plurality of circuit boards may function as the controller 180. The circuit board 282 is electrically coupled to an antenna device (not shown) and processes a radio signal corresponding to a radio electromagnetic wave transceived by the antenna device. The main circuit board 282 may also be electrically coupled to the audio output module 152 (FIG. 1), the display panel 300, the battery 191 (FIG. 2B), the front camera 121 (FIG. 2A), and the rear camera 121' (FIG. 2B).

Referring to FIGS. 2A and 3, the display unit 151 and a main circuit board 282 are disposed between the front case 101 and the rear case 102. The display unit includes a window 210 and a display panel 300, that are coupled to opposite surfaces of the front case 101. For example, the window 210 may be coupled to one surface of the front case 101.

A touch sensor (not shown) may be mounted to the window 210. The touch sensor is transmissive and is configured to sense a touch input. The touch sensor may be mounted to the front surface of the window 210 and is configured to convert a voltage change applied onto a specific part of the touch sensor into an electrical input signal.

The display panel 300 may be mounted to the rear surface of the window 210, in which case the display panel 300 may be a liquid crystal display (LCD) apparatus, for example. The LCD apparatus includes liquid crystals (LC) injected between two transparent substrates. Transmissivity of the LC changes based on an electric field applied to the liquid crystals.

For example, an LC panel operates by varying the transmissivity of light based on a molecular arrangement of liquid crystals. The molecular arrangement changes as a voltage is applied to liquid crystals having an intermediate property between a liquid state and a solid state at a specific temperature. The liquid crystals maintain an initial arrangement state before the voltage is applied. In the LCD apparatus, liquid crystals are aligned by patterned electrodes. Hereinafter, a structure of the LCD apparatus including the patterned electrodes will be explained.

Figure 4:
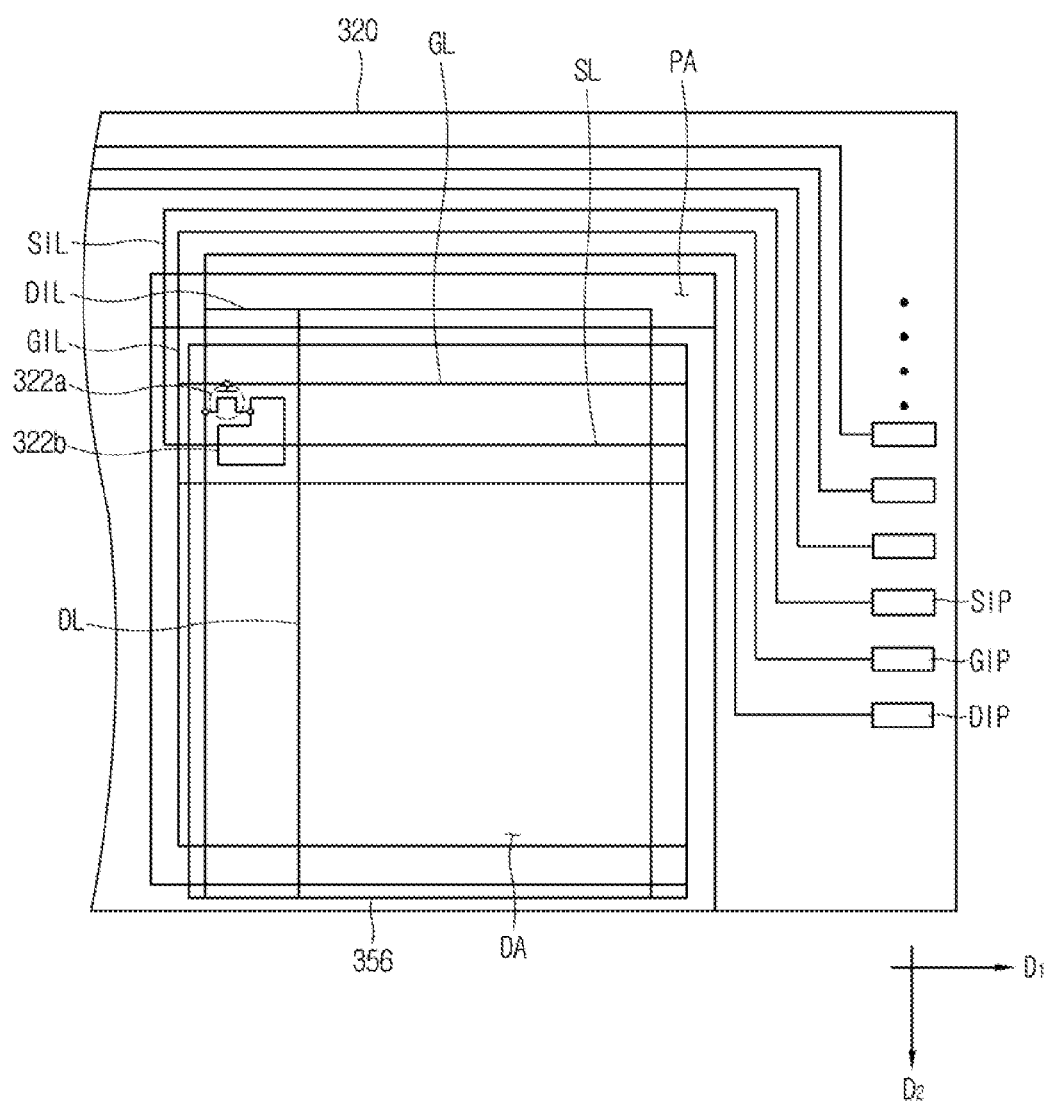
FIG. 4 is a planar view of a first panel of a liquid crystal display (LCD) panel according to an embodiment of the present invention.
Figure 5:
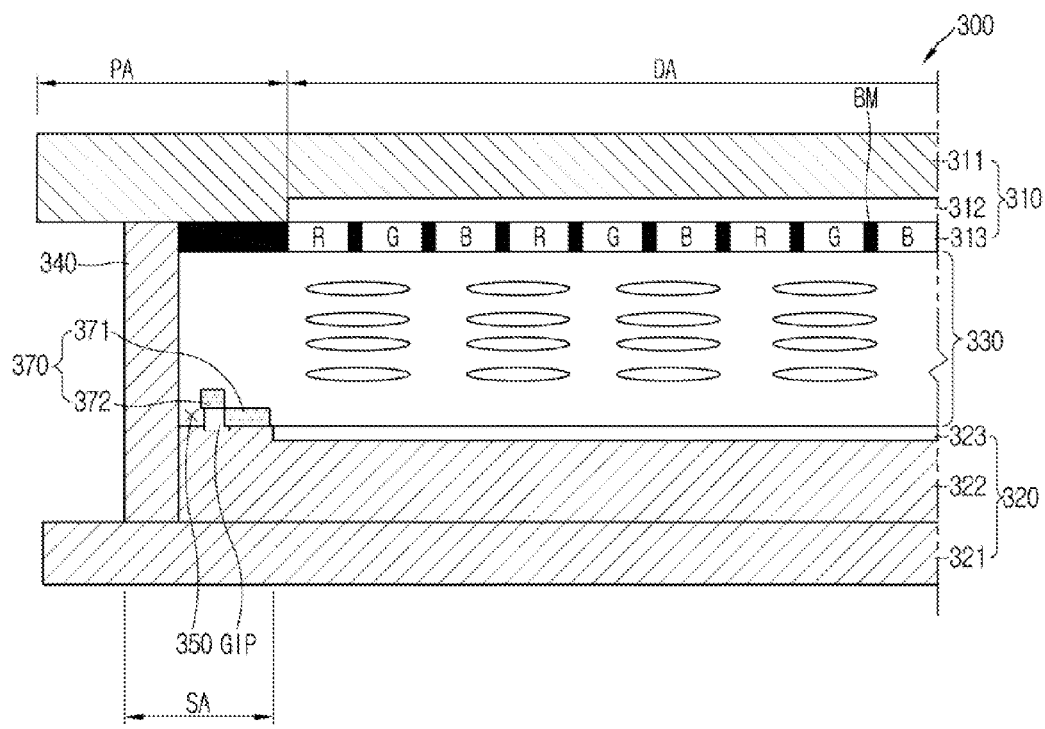
FIG. 5 is a sectional view taken along line 'A-A' in FIG. 3.
Figure 6:
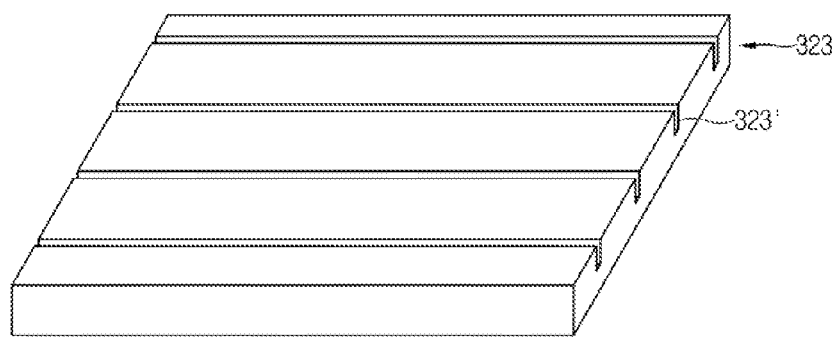
FIG. 6 is an enlarged view of a transparent electrode of FIG. 5.

FIG. 4 is a planar view of a first panel of an LCD panel. FIG. 5 is a sectional view taken along line 'A-A' in FIG. 3. FIG. 6 is an enlarged view of a transparent electrode of FIG. 5.

Referring to FIG. 5, the LCD apparatus 300 includes an upper substrate 310, a lower substrate 320 facing the upper substrate 310, a liquid crystal layer 330 positioned between the upper substrate 310 and the lower substrate 320, and a seal line 340 configured to attach the upper substrate 310 and the lower substrate 320 to each other. Although not shown, a backlight assembly configured to provide light to the upper substrate 310 from the lower substrate 320 is positioned below the lower substrate 320.

Light emitted from the backlight assembly changes its path while passing through the lower substrate 320 and the LC layer 330. The emitted light is recognized by a user after passing through the upper substrate 310.

The LCD apparatus 300 is divided into a display region (DA) for displaying an image, and a peripheral region (PA) which surrounds the display region (DA). The peripheral region (PA) includes a region where the seal line 340 is formed, and no image is displayed in the peripheral region (PA). The peripheral region (PA) may overlap part of the front case 101 (FIG. 3) that supports the display panel 300.

The display region (DA) includes a pixel portion in the lower substrate 320, a color portion that includes the upper substrate 310, and a liquid crystal (LC) layer 330 positioned between the pixel portion and the color portion. The LCD apparatus may be operated in a twisted nematic (TN) mode or a vertical alignment (VA) mode.

The upper substrate 310 includes a first base substrate 311, a common electrode 312 and a color filter layer 313. The first base substrate 311 may be made of glass or ceramic. The common electrode 312 is positioned on a surface of the first base substrate 311.

The color filter layer 313 includes a black matrix (BM) and a color filter pattern. The color filter pattern may include a red color filter (R), a green color filter (G) and a blue color filter (B). The black matrix (BM) is formed between the color filters and is configured to block light.

The lower substrate 320 includes a second base substrate 321, a thin film transistor (TFT) layer 322 and a transparent electrode 323. The pixel portion of the lower substrate 320 is described in relation to FIG. 4.

Referring to FIG. 4, the pixel portion of the lower substrate 320 includes a plurality of pixels defined by a plurality of gate lines (GL) and a plurality of data lines (DL) in the form of matrices. The gate lines (GL) extend in a first direction (D1), and the data lines (DL) extend in a second direction (D2) that crosses the first direction (D1), and the data lines (DL) and the gate lines (GL) are insulated from each other.

Each of the pixels is connected to a thin film transistor (TFT) 322a and a drain electrode of the TFT 322a, and is provided with a pixel electrode 322b The pixel electrode 322b may be formed of a transparent conductive material, such as indium tin oxide (ITO) or indium zinc oxide (IZO). The pixel portion may also include supplementary electrode lines (SL) that face the pixel electrode 322b. An insulating layer is positioned between the supplementary electrode lines (SL) and the pixel electrode 322b.

A gate input line (GIL) and a data input line (DIL) are provided within the peripheral region (PA). The gate input line (GIL) is coupled to each end of the gate lines (GL) and is configured to electrically connect the gate lines (GL) to each other. Similarly, the data input line (DIL) is coupled to each end of the data lines (DL) and is configured to electrically connect the data lines (DL) to each other. A supplementary electrode input line (SIL) coupled to each end of the supplementary electrode lines (SL), when provided, and configured to electrically connect the supplementary electrode lines (SL) to each other may also be provided.

The lower substrate 320 may further include a gate input pad (GIP), a data input pad (DIP) and a supplementary electrode input pad (SIP). The gate input pad (GIP) is connected to the gate input line (GIL), the data input pad (DIP) is connected to the data input line (DIL), and supplementary electrode input pad (SIP) is connected to the supplementary electrode input line (SIL).

As previously explained, the plurality of gate lines (GL) arranged in the first direction (D1), and the plurality of data lines (DL) arranged in the second direction (D2), which crosses the first direction (D1), are formed in the display region (DA). A single pixel is defined by a space between the gate line (GL) and the data line (DL) where the gate line (GL) and data line (DL) cross.

Referring to FIG. 5 and FIG. 6, the transparent electrode 323 is positioned on the TFT layer 322. The transparent electrode 323 has a preset pattern of grooves, such as fine grooves 323', for aligning liquid crystals positioned between the upper substrate 310 and the lower substrate 320 in one direction.

Referring to FIG. 6, a plurality of fine grooves 323' extend in a same direction on a surface of the transparent electrode 323 such that the plurality of fine grooves 323' are substantially parallel to each other. The plurality of fine grooves 323' are positioned on the surface of the transparent electrode 323 that is away from the TFT layer 322 of FIG. 5 and faces the LC layer 330. Each of the fine grooves 323' of the plurality of fine grooves has a width of about 10 nm-20 nm. The fine grooves 323' may be formed by secondary sputtering lithography (SSL).

Secondary sputtering lithography is a method of etching a substrate by colliding a gas, such as ionized argon (Ar), for example, into the substrate in an accelerated manner. Particularly, a high molecular film coating is applied to a base substrate of the transparent electrode 323. Then, the ionized argon (Ar) is caused to collide with the high molecular film coating, thereby resulting in the fine grooves 323' being etched into the surface of the base substrate. The high molecular film covers surfaces of the fine grooves 323'.

Referring to FIG. 5, at least part of the LC layer 330 can directly contact the surface of the transparent electrode 323 having the plurality of fine grooves 323' such that at least some of the liquid crystals of the LC layer 330 are introduced into the fine grooves 323'. Having some of the liquid crystals positioned in the plurality of fine grooves 323' enables alignment of the liquid crystals in the direction in which the fine grooves 323' extend.

Since the liquid crystals of the liquid crystal layer 330 are aligned by the fine grooves 323' of the transparent electrode 323, additional alignment films are not required. For example, there is no requirement for two alignment films to be included in the upper substrate 310 and the lower substrate 320 of the LCD apparatus 300. This results in the thickness of the LCD apparatus 300 being smaller than the thickness of LCD apparatuses that include the two alignments films in the upper substrate and lower substrate, which in turn enables a reduction in the thickness of the mobile terminal 100.

Further, since the transparent electrode 323 and the liquid crystals directly contact each other, signals can be more rapidly transmitted to the LC layer 330 from the transparent electrode 323. This results in quicker control speed with respect to the liquid crystals. Further, since the transparent electrode 323 and the liquid crystals directly contact each other, the liquid crystals can be controlled in a lower voltage state.

Moreover, the fine grooves 323' may be formed to have a greater depth than width. This results in enhanced reliability in aligning liquid crystals, which in turn results in higher resolution of the LCD apparatus 300.

As shown in FIG. 5, the gate input pad (GIP) is formed close to the transparent electrode 323. A first insulating layer 371 may be formed between the transparent electrode 323 and the gate input pad (GIP) in order to prevent electric contact between the transparent electrode and the gate input pad (GIP).

A second insulating layer 372 may be formed on the gate input pad (GIP). At least part of the second insulating layer 372 is positioned to overlap the gate input pad (GIP). Particularly, the second insulating layer 372 is formed to cover the gate input pad (GIP) so that the gate input pad (GIP) cannot be viewed from outside of the LCD apparatus 300. The second insulating layer 372 may be made of a hardened insulating material.

The first insulating layer 371 and the second insulating layer 372 may be made using insulating polyimide. Additionally, the first insulating layer 371 and the second insulating layer 372 may be integrally formed with each other. For example, an insulating material may be applied onto the TFT layer 322 so as to cover the gate input pad (GIP) close to the transparent electrode 323. Then, the insulating material is hardened via ultraviolet ray irradiation, for example. Alternatively, the insulating material may be hardened via high energy visible rays or infrared rays, for example.

Ultraviolet rays having a wavelength of about 400 nm may be used to harden the insulating material of the first insulating layer 371 and second insulating layer 372. The ultraviolet rays may be provided via a high pressure mercury lamp, a low pressure mercury lamp, or a xenon-lamp, for example.

Conventional alignment films are not provided in the LCD apparatus 300. However, even with the omission of conventional alignment films formed of an insulating material and covering the transparent electrode 323, electrical contact between the gate input pad (GIP) and the transparent electrode 323 can be prevented by the first insulating layer 371. Further, the appearance of the display panel is enhanced by having the gate input pad (GIP) covered by the second insulating layer 372. Additionally, since the insulating layer 370 formed at the peripheral region (PA) does not overlap the LC layer 330, the thickness of the LCD apparatus 300 is not increased.

The seal line 340 is positioned between, and contacts each of, the upper substrate 310 and the lower substrate 320 and is configured to couple the upper substrate 310 and the lower substrate 320 together. The seal line 340 may be applied onto the lower substrate 320 and then hardened using ultraviolet rays, thereby coupling the upper substrate 310 and the lower substrate 320 together.

The seal line 340 and the gate input pad (GIP) are spaced from each other by a preset distance. A region from the seal line 340 to the gate input pad (GIP) is defined as a seal pattern portion (SA). When forming the seal line 340 by a hardening method using ultraviolet rays, the seal pattern portion (SA) is required during a hardening process. The peripheral region (PA), which includes the seal pattern portion (SA), may overlap the front case 101 (FIG. 3) and may be fixed to the terminal body.

The seal pattern portion (SA) includes a gap 350 formed between the seal line 340 and the gate input pad (GIP). The gap 350 prevents the seal line 340 from overlapping the gate input pad (GIP) while the seal line 340 undergoes the ultraviolet ray hardening process, which would prevent hardening of the seal line 340.

Figure 7:
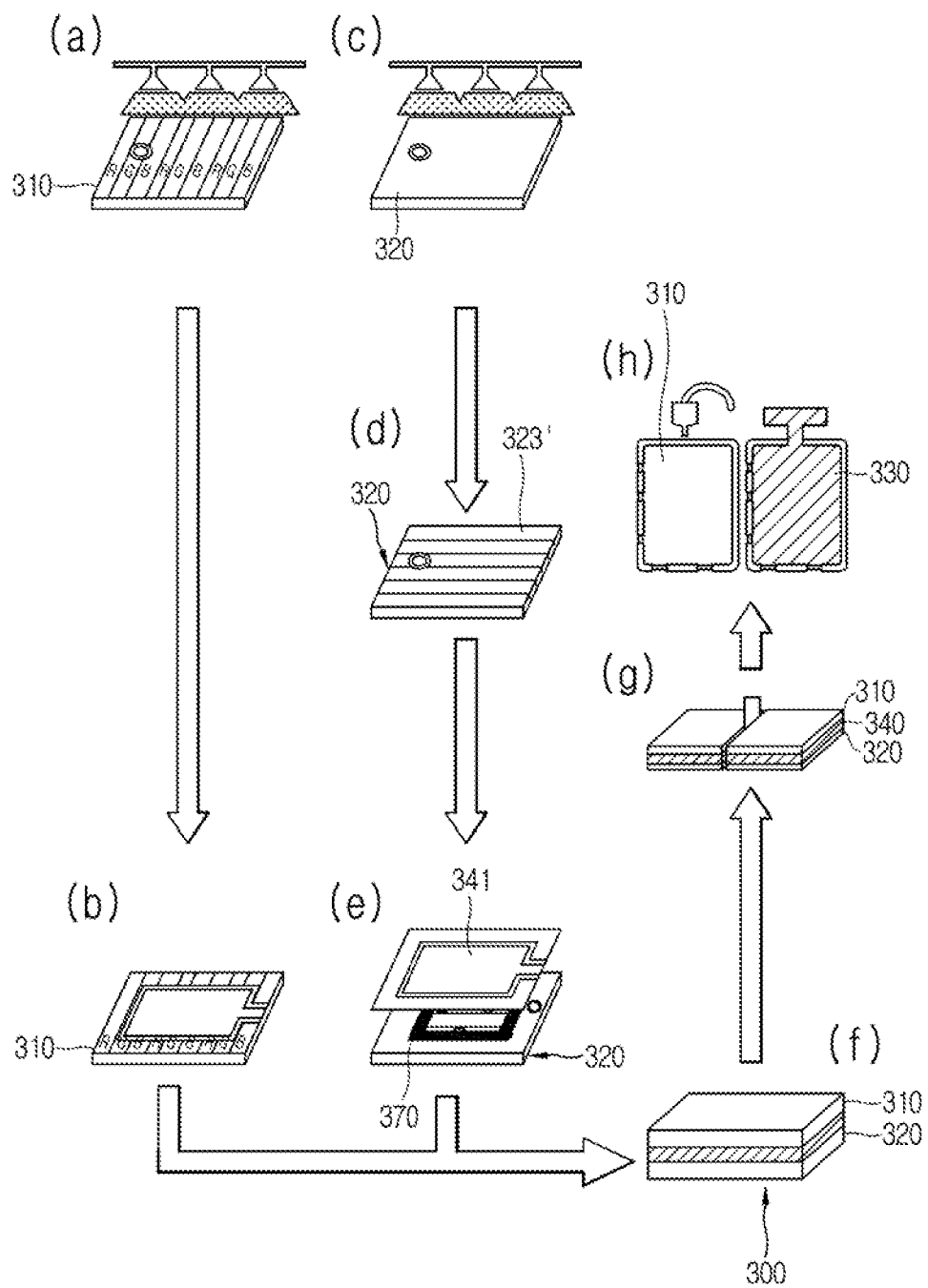
FIG. 7 is a schematic depicting a method of manufacturing the LCD panel of FIG. 5.

An example of a method of manufacturing the LCD apparatus 300 will be explained. FIG. 7 is a schematic depicting a method of manufacturing the LCD panel 300 of FIG. 5.

Referring to FIG. 5 and FIGS. 7(*a*) and 7(*c*), the upper substrate 310 and the lower substrate 320 undergo a washing process to remove impurities from the surfaces of the upper substrate and lower substrate. Referring to FIG. 7(*d*), a plurality of fine grooves 323' extending in a same direction are formed on a surface of the transparent electrode 323 (FIG. 6), which is attached to one surface of the lower substrate 320, by secondary sputtering lithography (SSL).

Referring to FIG. 7(*e*), a seal mask 341 for forming the seal line 340 is formed on the lower substrate 320. Also, an insulating material is applied onto the lower substrate 320, close to the edge of the transparent electrode 323, and. Then, referring to FIGS. 7(*f*) and 7(*g*), the upper substrate 310 and the lower substrate 320 are attached to each other. Then, the seal mask 341 is irradiated using ultraviolet rays to form the seal line 340, and the insulating material is irradiated using ultraviolet rays to form the insulating layer 370.

Referring to FIG. 7(*h*), liquid crystals are injected between the upper substrate 310 and the lower substrate 320. As previously described, the liquid crystals are aligned by the fine grooves 323' of the transparent electrode 323 such that an additional alignment process is not required in the LC injection step. The manufacturing process is simplified in comparison to conventional LCD panels because a step of applying alignment films for aligning liquid crystals in one direction onto the upper substrate 310 and the lower substrate 320 and a step of rubbing the alignment films are not required.

Figure 8:
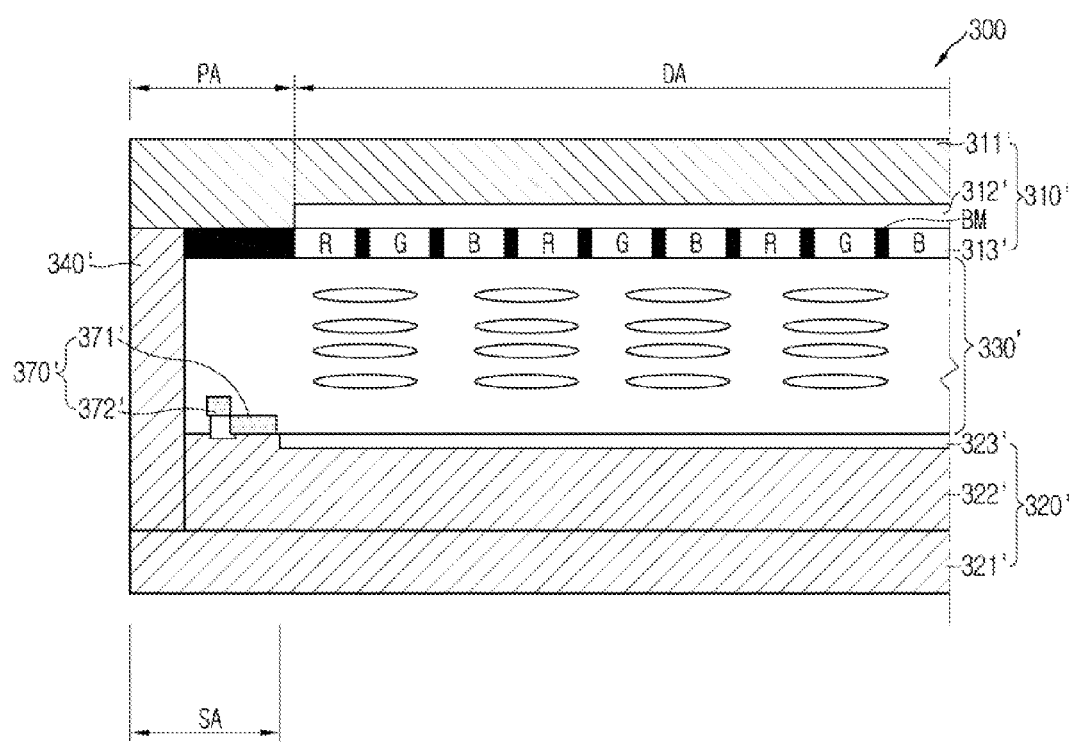
FIG. 8 is another sectional view taken along line 'A-A' in FIG. 3.

FIG. 8 is another sectional view taken along line 'A-A' in FIG. 3. Referring to FIG. 8, the LCD apparatus 300' has the same structure as the LCD apparatus 300 of FIG. 5, except for the position of the seal line 340'. Therefore, the same components will be provided with the same reference numerals as the components of FIG. 5 and detailed explanations thereof will be omitted.

The seal line 340' is formed at the edge of the LCD apparatus 300', as opposed to the seal line 340 being formed a distance from the edge of the LCD apparatus 300 of FIG. 5. Having the seal line 340' formed at the edge of the LCD apparatus 300', the peripheral region (PA) and the seal pattern portion (SA) may be substantially the same.

With the LCD apparatus 300' of FIG. 8, a region of the LCD apparatus 300' overlapping the front case 101 (FIG. 3) is limited to the seal pattern portion (SA). In turn, this allows for a larger display region (PA).

Figure 9:
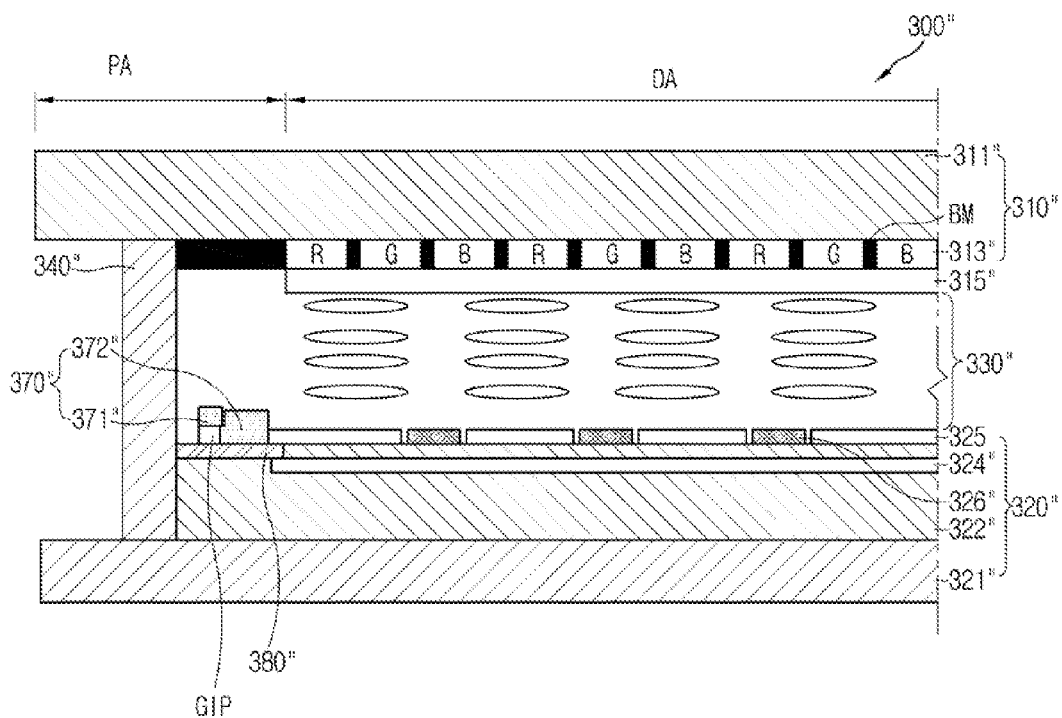
FIG. 9 is another sectional view taken along line 'A-A' in FIG. 3.
Figure 10:
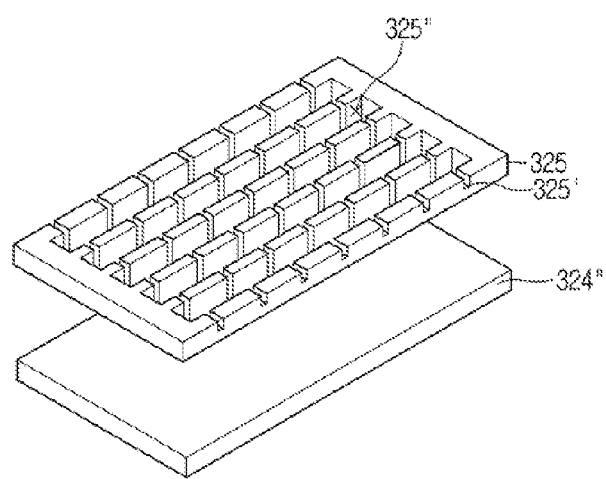
FIG. 10 is an enlarged perspective view of a common electrode of FIG. 9.

FIG. 9 is another sectional view taken along line 'A-A' in FIG. 3. FIG. 10 is an enlarged perspective view of a common electrode of FIG. 9.

Referring to FIG. 9, the LCD apparatus 300" is operated in an in-plane switching (IPS) mode. The LCD apparatus 300" may include an upper substrate 310", a lower substrate 320", a liquid crystal layer 330 disposed between the upper substrate 310" and the lower substrate 320", a backlight assembly (not shown) for providing light towards the lower substrate 320", and a seal line 340 for attaching the upper substrate 310" and the lower substrate 320" together.

The upper substrate 310" may include a first base substrate 311", a color filter layer 313", and an alignment film 315". The color filter layer 313" is formed on a surface of the first base substrate 311" facing the lower substrate 320". The color filter layer 313" is provided with a black matrix (BM) and a color filter pattern. The color filter pattern may include a red color filter (R), a green color filter (G) and a blue color filter (B). The black matrix (BM) is formed between the color filters and is configured to block light.

The alignment film 315" is formed on the color filter layer 313". The alignment film 315" contacts the LC layer 330" and is configured to align liquid crystals (which change into LC molecules) in one direction. The alignment film 315" may be formed of polyamide or polyamide acid, for example. The alignment film 315" may be aligned via a rubbing process.

The lower substrate 320" includes a second base substrate 321", a TFT layer 322", a pixel electrode 324", and a common electrode 325". The pixel electrode 324" is connected to a drain electrode (not shown) of the TFT layer 322", and is formed of a transparent conductive material.

Referring to FIGS. 9 and 10, the common electrode 325 is formed on the TFT layer 322". The common electrode 325 includes a plurality of gaps 325" extending in a second direction, such that the plurality of gaps 325" are substantially parallel to each other. Having the plurality of gaps 325", the common electrode 325 includes a plurality of electrode layers 325" that are separated from each other by the plurality of gaps 325".

A plurality of grooves, such as fine grooves 325', are formed on a surface of the common electrode 325 that is away from the TFT layer 322". The plurality of fine grooves 325' extend in a same, first direction, such that the plurality of fine grooves 325' are substantially parallel to each other. Moreover, the first direction of the plurality of fine grooves 325' crosses the second direction of the plurality of gaps 325". The plurality of fine grooves 325' may be formed via secondary sputtering lithography (SSL).

An insulating material 326" may be positioned on the TFT layer 322" in the gaps 325" between the common electrode layers 325". In this manner, the common electrode 325 and the insulating material 326" are positioned substantially on the same plane. The insulating material 326" is configured to restrict static electricity between the common electrode layers 325".

The insulating material 326" may be formed of the same material as the alignment film 315". The insulating material 326" and the alignment film 315" may be formed of polyvinyl alcohol (PVA). The PVA is not transformed by UV irradiation. Therefore, the PVA does not produce any adverse effects during a process of forming the seal line 340 and is advantageous for a thermal sealing process.

Alternatively, the insulating material 326" and the alignment film 315" may be formed of soluble polyimide (SPI). SPI can be processed at a low temperature and has a high insulating property, which enhances its reliability for controlling liquid crystal molecules. The SPI of the alignment film 315" may be aligned via a rubbing process.

An organic material layer 380" is positioned between the pixel electrode 324" and the gate input pad (GIP). The organic material layer 380" is configured to prevent electrical contact between the pixel electrode 324" and the gate input pad (GIP).

The insulating layer 370" covers the gate input pad (GIP) such that the gate input pad (GIP) is not visually exposed to the outside. The insulating layer 370" also insulates the common electrode 325 from the gate input pad (GIP).

The insulating layer 370" includes a first insulating layer 371" overlapping the gate input pad (GIP) and a second insulating layer 372" positioned between the gate input pad (GIP) and the common electrode 325. The first insulating layer 371" and the second insulating layer 372" may be formed separately or integrally. The insulating layer 370" may be implemented in the form of a film, and may be attached onto the organic material layer 380".

In the embodiment of FIG. 9, no alignment film is formed on the common electrode 325. Rather, liquid crystal molecules can be aligned by a single alignment film 315" positioned on the color filter layer 313" and by a pattern of the common electrode, which enables the thickness of the LCD apparatus 300" to be reduced. Moreover, since an insulating layer 326" is formed at the gaps 325" in the patterned common electrode 325, static electricity between the common electrode layers can be prevented.

Figure 11:
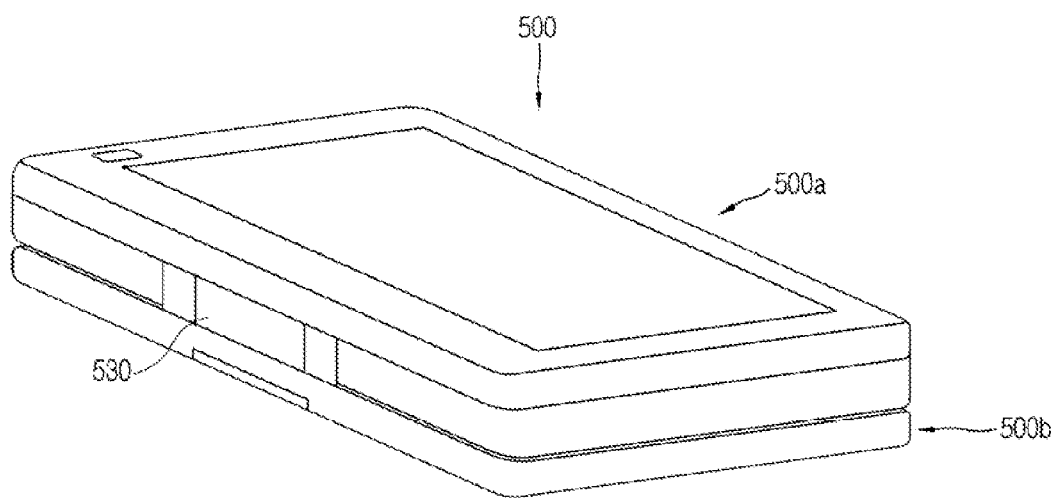
FIG. 11 is a perspective view of a mobile terminal incorporating an LCD apparatus according to an embodiment of the present invention.
Figure 12:
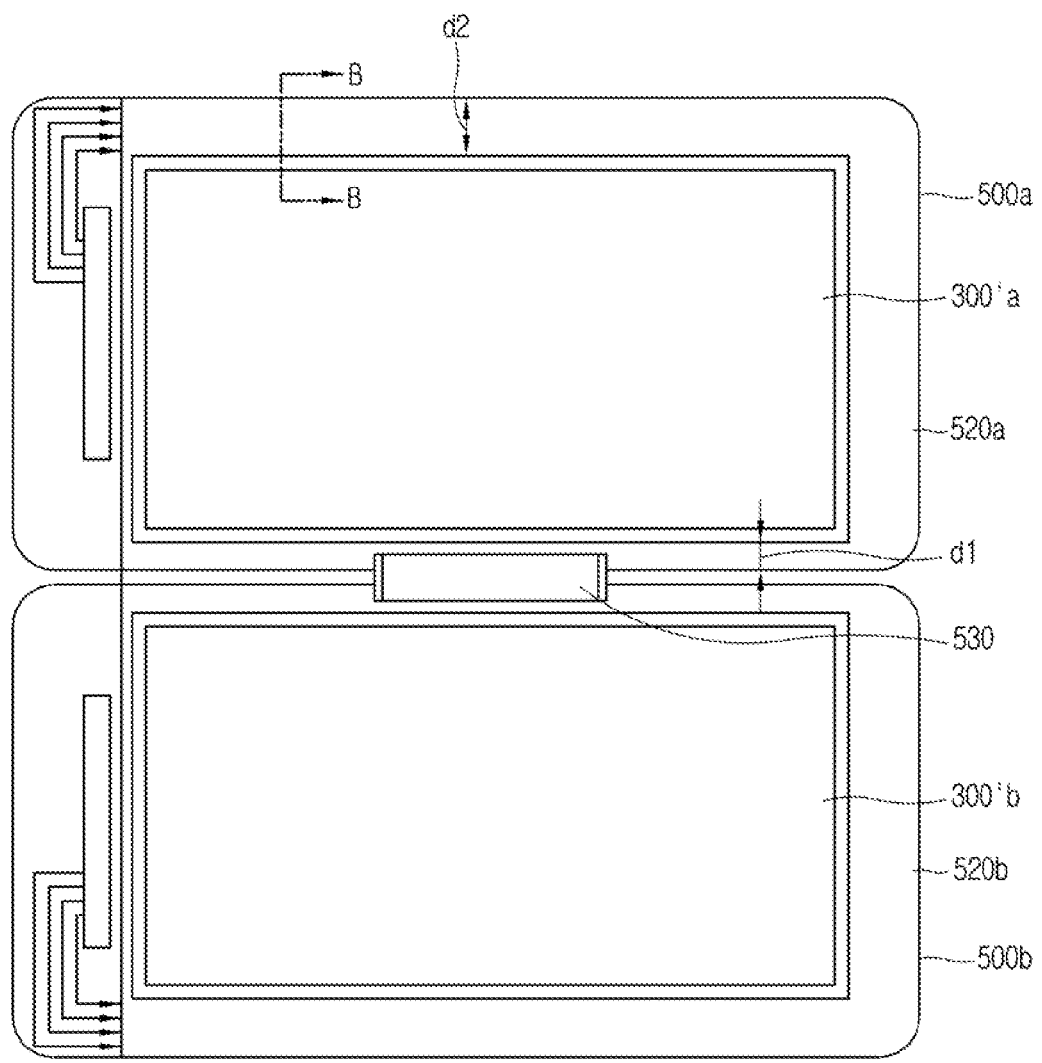
FIG. 12 is a view depicting the mobile terminal of FIG. 11 in an open condition.
Figure 13:
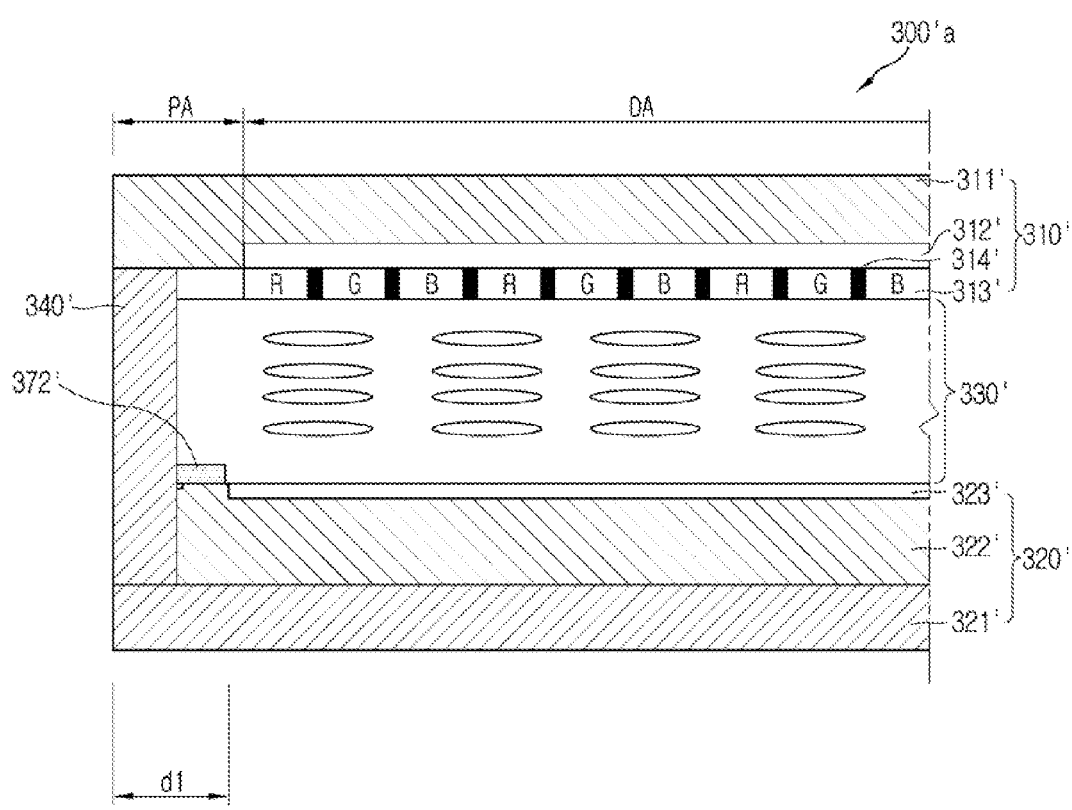
FIG. 13 is a sectional view of the LCD panel of the mobile terminal of FIG. 12 taken along line 'B-B' in FIG. 12.

FIG. 11 is a perspective view of a mobile terminal incorporating an LCD apparatus. FIG. 12 is a view illustrating the mobile terminal of FIG. 11 in an open configuration. FIG. 13 is a sectional view of the LCD panel of the mobile terminal of FIG. 12 taken along line 'B-B' in FIG. 12.

Referring to FIG. 12, a mobile terminal 500 includes a first body portion 500a provided with a first LCD apparatus 300'a and a second body portion 500b provided with a second LCD apparatus 300'b. The first LCD apparatus 300'a and second LCD apparatus 300'b may be implemented in various manners, such as that depicted in FIG. 13. As depicted in FIG. 12, the first LCD apparatus 300'a may be fixed to a first case 520a of the first body portion 500a and the second LCD apparatus 300'b may be fixed to a second case 520b of the second body portion 500b.

Referring to FIGS. 11 and 12, the mobile terminal 500 also includes a hinge portion 530 for rotatably coupling the first body portion 500a and the second body portion 500b together. Particularly, the first body portion 500a and the second body portion 500b can rotate relative to each other between an open state and a closed state. As depicted in FIG. 12, in the open state the first body portion 500a and the second body portion 500b are rotatably positioned at a prescribed angle such that the first LCD apparatus 300'a and the second LCD apparatus 300'b are exposed to the outside. In FIG. 11, in a closed state the first body portion 500a and the second body portion 500b overlap each other such that the first LCD apparatus 300'a and the second LCD apparatus 300'b are not visible.

As depicted in FIG. 13, the first LCD apparatus 300'a includes an upper substrate 310', a lower substrate 320', an LC layer 330', and a seal line 340' for coupling the upper and lower substrates 310' and 320' together. The first LCD apparatus 300'a and second LCD apparatus 300'b are substantially the same. Moreover, the first LCD apparatus 300'a depicted in FIG. 13 has substantially the same configuration as the LCD apparatus 300' depicted in FIG. 8, except for the components included in the peripheral region (PA). Therefore, the components of the first LCD apparatus 300'a of FIG. 13 will be provided with the same reference numerals as the LCD apparatus 300' of FIG. 8, and explanations thereof will be omitted.

Comparing FIG. 8 to FIG. 13, in FIG. 13 only the seal line 340' and the second insulating layer 372' are positioned in the peripheral region (PA). The gap 350' and the gate input pad (GIP) of the LCD apparatus of FIG. 8 are not implemented in the first LCD apparatus 300'a of FIG. 13. Since the gate input pad (GIP) is not implemented, the first insulating layer 371' of FIG. 8 for preventing the gate input pad (GIP) from being exposed to the outside may be also omitted.

The seal line 340' of FIG. 13 can be formed by drawing a sealant using a nozzle, rather than through UV irradiation, thereby rendering the gap unnecessary. Since the seal line 340' is formed closer to the display region (DA), the display region (DA) can be increased. Moreover, a width of a bezel portion of the case overlapping the peripheral region (PA) when the first LCD apparatus is fixed to the first case 520a of the first LCD apparatus 510a may be reduced.

Specifically, referring to FIGS. 12 and 13, the bezel portion of the first LCD apparatus 300'a adjacent to the hinge portion 530 and second LCD apparatus 300'b has a first width (d1) smaller than a second width (d2) of a bezel portion of the first LCD apparatus 300'a away from the hinge portion 530 and second LCD apparatus 300'b. Accordingly, the first and second LCD apparatus 300'a and 300'b can be positioned closer to each other, thereby allowing a user to more easily view the first LCD apparatus 300'a and second LCD apparatus 300'b consecutively or simultaneously. Moreover, as the second width (d2) is greater than the first width (d1), the first LCD apparatus 300'a can be stably fixed to the first case 520a and the second LCD apparatus 300'b can be stably fixed to the second case 520b.

Referring to FIGS. 4 and 12, an output part of a gate input pad (GIP) of a data integrated circuit (D-ic) of the mobile terminal may be formed at the bezel portion having the second width (d2) as an alternative. Accordingly, the output part of the gate input pad (GIP) can be more stably formed at the relatively wider bezel portion.

The previously described LCD apparatuses provide the following advantages. Since no alignment film is required, the LCD apparatus, and consequently the mobile terminal incorporating the LCD apparatus, can be made thinner. Also, since the transparent electrodes directly contact LC molecules, alignment of the liquid crystals can be easily controlled, even in a low voltage state, and the reliability of the liquid crystal alignment can be enhanced.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD), comprising:
a first base substrate comprising a first surface;
a second base substrate comprising a second surface facing the first surface;
a liquid crystal layer positioned between the first base substrate and the second base substrate, the liquid crystal layer comprising liquid crystal molecules configured to change alignment when electrical power is applied to the liquid crystal molecules;
a first electrode positioned on the second surface, the first electrode comprising a substantially parallel plurality of grooves extending in a first direction on a surface of the first electrode facing the liquid crystal layer and the first base substrate, the plurality of grooves configured to align the liquid crystal molecules in a preset direction when the electrical power is applied to the liquid crystal molecules; and
a second electrode positioned on the first surface or the second surface,
wherein a voltage difference between the first electrode and the second electrode applies the electrical power to the liquid crystal molecules, and
wherein the second electrode is positioned on the second surface,
wherein the first electrode further comprises a substantially parallel plurality of electrode layers extending in a second direction that crosses the first direction, and
wherein the plurality of electrode layers are separated from each other by gaps.

2. The LCD of claim 1, further comprising:
signal lines positioned on the second surface, spaced apart from the first electrode and configured to transfer signals; and
an insulating layer positioned between the signal lines and the first electrode and configured to provide electrical insulation between the first electrode and the signal lines.

3. The LCD of claim 2, wherein the insulating layer overlaps the signal lines and is further configured to prevent the signal lines from being visible from outside the LCD.

4. The LCD of claim 1, wherein the plurality of grooves are formed on the surface of the first electrode by etching the first electrode with an ionized gas.

5. The LCD of claim 1, further comprising:
an insulating material positioned in the gaps and configured to restrict static electricity between the plurality of electrode layers.

6. The LCD of claim 5, further comprising:
an alignment film positioned on the first surface and configured to align the liquid crystal molecules in the preset direction.

7. The LCD of claim 6, wherein the alignment film and the insulating material comprise a same material.

8. The LCD of claim 1, further comprising:
a seal positioned along edges of the first base substrate and the second base substrate and configured to couple the first base substrate to the second base substrate.

9. The LCD of claim 1, further comprising:
a thin film transistor (TFT) layer formed on the second base substrate;
a seal line positioned between the first and second base substrate for coupling the first and second base substrate;
characterized in that the LCD includes a gate input pad (GIP) formed on the one surface of the thin film transistor layer space apart from the first electrode, an insulating layer positioned between the gate input pad and the first electrode positioned to provide electric insulation between the first electrode and the gate input pad (GIP), and a gap is formed between the insulating layer and the seal line, and
wherein the first electrode is positioned on one surface of the thin film transistor (TFT) layer.

10. A mobile terminal, comprising:
a first body portion housing a first liquid crystal display (LCD);
a second body portion housing a second liquid crystal display (LCD); and
a hinge rotatably coupling the first body portion and second body portion together,
wherein each of the first LCD and second LCD comprises:
a first base substrate comprising a first surface;
a second base substrate comprising a second surface facing the first surface;
a liquid crystal layer positioned between the first base substrate and the second base substrate, the liquid crystal layer comprising liquid crystal molecules configured to change alignment when electrical power is applied to the liquid crystal molecules;
a first electrode positioned on the second surface, the first electrode comprising a substantially parallel plurality of grooves extending in a first direction on a surface of the first electrode facing the liquid crystal layer and the first base substrate, the plurality of grooves configured to align the liquid crystal molecules in a preset direction when the electrical power is applied to the liquid crystal molecules; and
a second electrode positioned on the first surface or the second surface,
wherein a voltage difference between the first electrode and the second electrode applies the electrical power to the liquid crystal molecules, and
wherein each of the first LCD and second LCD further comprises:
a display region configured for outputting visual information; and
a peripheral region surrounding the display region,
wherein a side of the peripheral region closest to the hinge is narrower than a side of the peripheral region furthest from the hinge.

11. The mobile terminal of claim 10, wherein each of the first LCD and second LCD further comprises:
a plurality of signal lines configured to transfer signals to the side of the peripheral region furthest from the hinge.

12. The mobile terminal of claim 10, wherein:
the second electrode of each of the first LCD and second LCD is positioned on the corresponding first surface; and
the first electrode of each of the first LCD and second LCD further comprises a substantially parallel plurality of electrode layers extending in a second direction that crosses the first direction, the plurality of electrode layers separated from each other by gaps.

* * * * *